March 8, 1966 W. G. SPRUTH 3,239,813
SLOW SPEED SCANNING OF INPUT TERMINALS BY LUMPED CONSTANT DELAY LINE
Filed June 28, 1961
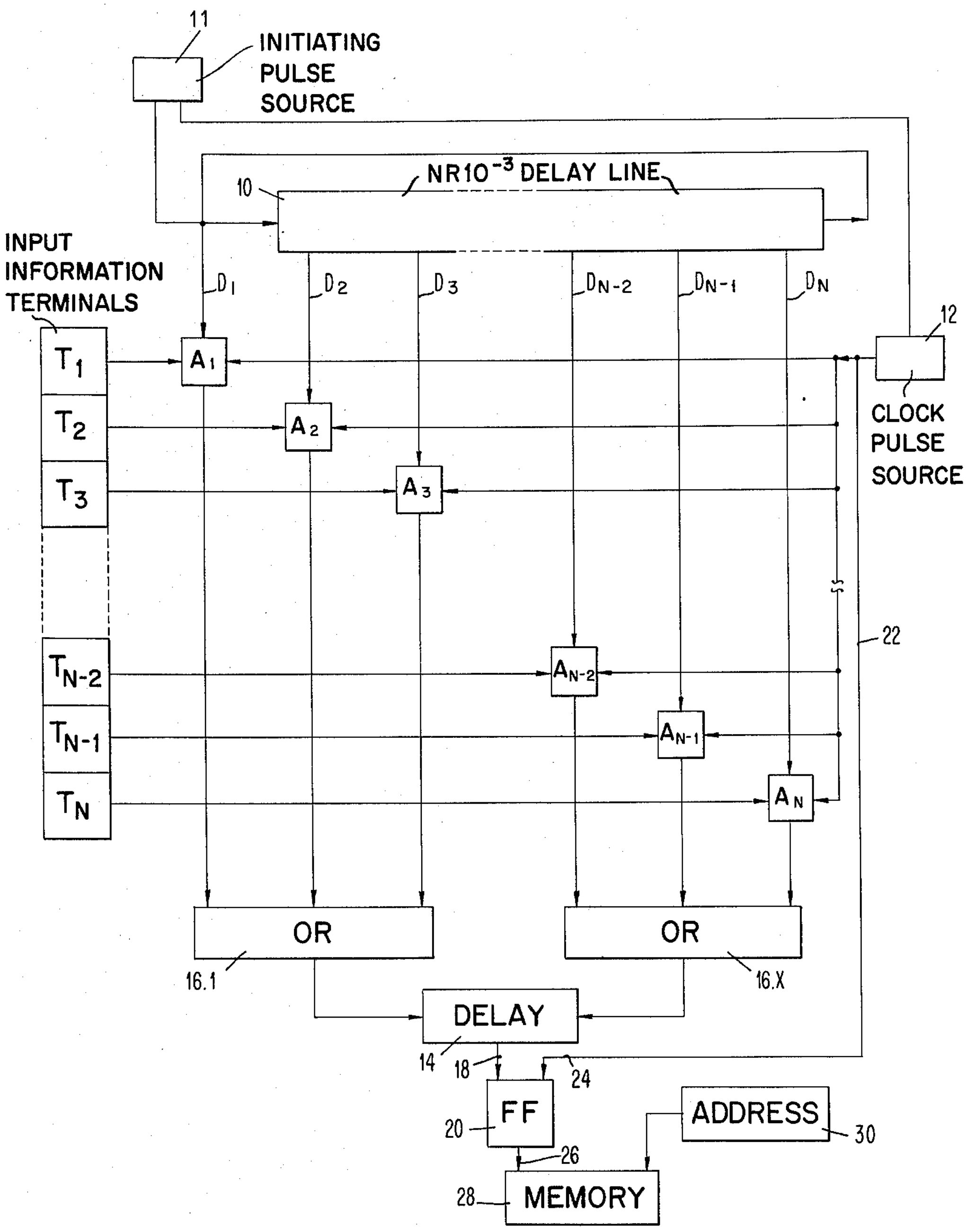
INVENTOR
WILHELM G. SPRUTH
BY [signature]
ATTORNEY 3,239,813
Patented Mar. 8, 1966

3,239,813

SLOW SPEED SCANNING OF INPUT TERMINALS BY LUMPED CONSTANT DELAY LINE

Wilhelm G. Spruth, Peekskill, N.Y., assignor to International Business Machines Corporation, New York, N.Y., a corporation of New York Filed June 23, 1961, Ser. No. 120,282
4 Claims. (Cl. 340—147)

This invention relates to scanning circuits, and more particularly to a low speed scanning circuit employing a high speed lumped constant delay line in combination with a clock pulse source for gating and scanning information input terminals.

In a scanning circuit, information from outlying terminal sets is scanned for processing in a central data handling system, and the speed of scanning is usually slow in comparison to the speed in the data handling system due to resolution problems. Slow speed scanning circuits heretofore employed have utilized a long constant delay line or a ring counter for providing the desired delay between sampling pulses. Other circuits which employ a binary counter and a decoding matrix have also been utilized, however these circuits are costly with the counter and decoding matrix also subject to the further criticism of poor reliability, since such a circuit requires much more hardware enhancing the possibility of breakdown.

What has been found is, that a low speed scanning circuit may be constructed to scan a number of N information input terminals within a predetermined interval SR by employing a NR $10^{-3}$ delay line having N output taps and a clock source for providing a sequence of pulses displaced by $SR/N$ time units. Scanning is then achieved by gating each respective one of the N input terminals with a respective one of the N output taps of the delay line and with the pulses from the clock source. More specifically, a scanning circuit is constructed according to this invention capable of slowly scanning a number of N input terminals within a predetermined sampling interval of S milliseconds by employing an N microsecond delay line having N output terminals tapped for a one microsecond delay between terminals, and a clock pulse source for delivering a sequence of pulses approximately displaced by $SR/N$ microseconds. The desired sampling and scanning is then achieved by employing N number of AND circuits for gating each respective one of the N input terminals with a respective one of the N output terminals of the delay line and with the pulses from the clock source. Construction of such a circuit materially decreases costs since high speed delay lines are easily fabricated requiring much less hardware than long delay lines or binary counters. Reliability is enhanced since less components are required.

Accordingly, it is a prime object of this invention to provide an improved low speed scanning circuit.

Another object of this invention is to provide an improved low speed scanning circuit whose construction cost is minimal.

Yet another object of this invention is to provide an improved low speed scanning circuit employing a high speed lumped constant delay line.

The foregoing and other objects, features and advantages of the invention will be apparent from the following more particular description of preferred embodiments of the invention, as illustrated in the accompanying drawings.

In the drawings:

The single figure of the drawing is a schematic illustration of a basic scanning circuit according to this invention.

A scanning circuit, according to the principles of this invention, is constructed as shown in the drawing. Referring to the drawing, a plurality of input terminals $T_1$–$T_N$ to be scanned are each connected to one input of a respective three-way AND circuit $A_1$–$A_N$. A closed loop lumped constant delay line 10 having a plurality of outputs $D_1$–$D_N$, is provided with the different outputs $D_1$–$D_N$ of the line 10 connected to a second input of one of the different three-way AND circuits $A_1$–$A_N$. An "initiate sampling" pulse is provided by an external program or control designated by box 11 which provides the pulse to the delay line 10 and initiates the clock pulse source 12. Such pulse may be provided or derived from any desired source such as a suitably programmed computer or even by a manual push button as will be readily understood by one skilled in the art. A clock pulse source 12 is provided which is connected to a third input of each of the AND circuits $A_1$–$A_N$. Each AND circuit $A_1$–$A_N$ has its output connected to a delay device 14 through a logical OR circuit 16.1 . . . 16.X. The output of the delay device 14 is connected to a set terminal 18 of a flip-flop 20, while an output line 22 of the source 12 is connected to a reset terminal 24 of flip-flop 20. An output 26 of the flip-flop 20 is in turn connected to a storage medium 28 employed as a memory for the scanned information input, while an addressing means 30 serves to properly register the information scanned into the proper location in the memory 28.

As one embodiment of this invention, assume the number of input terminals, $T_N$, is defined by $N=31$. Further, that the information pulse in each terminal designating a bit of binary information is approximately 6 milliseconds in length. In such circuits each bit of information is usually read at least twice to insure that the scanned information is correct, or that the correct information has been read. This, then, is a factor which determines the sampling interval (SR) of the circuit and for a 6 millisecond pulse length, a sampling interval (SR) of 2.4 milliseconds may be employed to insure that each bit is scanned at least twice allowing a certain degree of variance. Thus the circuit is designed to provide a predetermined sampling interval (SR) of 2.4 where (R) designates time units in milliseconds. The delay line 10 is then constructed to provide a lumped constant delay of NR $10^{-3}$ or 31 microseconds with each output $D_1$–$D_N$ providing a half microsecond pulse for each succeeding microsecond of delay. The time increment between pulses from the clock source 12 is then determined by a relationship of the Sampling Interval (SR) desired, divided by the number of input terminals N providing the equation $SR/N$, which dictates that a pulse from the source 12 occur approximately every $SR/N=(2.4\times10^{-3})/31\approx78\times10^{-6}$ secs. or microseconds. Thus, the source 12 is constructed to provide a pulse of approximately 0.5 microsecond length every 78 microseconds. Such a timing relationship provides sampling of each terminal T every 2.4 milliseconds and further insures the capability of the circuit to sample of each input information bit twice during its 6 millisecond duration. Further, such a circuit insures that each terminal is sampled once before any other terminal is sampled twice.

With the circuit of the drawing constructed as set forth above, assume that the line $D_2$ is energized and the source 12 is providing an output which enables the gate $A_2$ to pass an information bit to the delay 14 through the OR gate 16. The delay 14 acts to delay any input to the flip-flop 18 at least 0.5 microsecond. During this time, the source 12 provides a pulse to the reset input 24 of flip-flop 20 to reset the flip-flop 20. After termination of the pulse from the source 12, via line 22, the delay device 14 provides an impulse to the set input 18 of flip-flop 20 which provides an input to a selected position of the memory 28 as dictated by the addressing means 30.

One microsecond later, the output of $D_3$ of line 10 is up, however the source 12 is not operative, therefore the gate $A_3$ is not open to pass any information provided therein. It may be seen that the time of the next sampling is dependent upon the timing of the pulse from source 12 and line 10. Thus, 78 microseconds later after the gate $A_2$ is enabled, another pulse is emitted from source 12, at which time the line 10 is emitting an output on line $D_{18}$ to enable gate $A_{18}$ which passes any information provided on terminal $T_{18}$ to the delay 14 through OR circuit 16. The pulse from source 12 energizes the line 22 which resets the flip-flop 20 allowing this information, if present, to set the flip-flop 20 at least half a microsecond later which reads this bit into the memory 28 in a location synchronized by means 30.

The next gate which is enabled is $A_3$ to sample the information of terminal $T_3$ while the next gate enabled is $A_{19}$. Thus the sequence by which the different gates are enabled, starting with gate $A_2$ is; A2–A18–A3–A19–A4–A20–A5–A21–A6–A22–A7–A23–A8–A24–A9–A25–A10–A26–A11–A27–A12–A28–A13–A29–A14–A30–A15–A31–A16–A1–A17–A2, etc. Thus, each terminal is sampled once before any other terminal, $T_2$, is sampled again.

In the embodiment described above, it may be seen that the timing required for the source 12 is determined by the sampling interval (SR) required divided by the number of terminals T, while the length of the delay line 10 is directly determined by the number of terminals T to be scanned.

As a further embodiment, if 36 terminals were to be scanned at a sampling rate of 2.4 milliseconds, the delay line 10 would be constructed to provide a lump delay of 36 microseconds while the source 12 is constructed to provide a pulse once every 67 microseconds. Assuming, as in the embodiment above, that the line $D_2$ from the delay 10 is activated while the source 12 is also activated, the AND circuit $A_2$ is enabled to pass an output from terminal $T_2$ to the delay 14 through OR gate 16. The flip-flop 20 is first reset by the source 12 via the line 22 while the output to the flip-flop 20 via line 18 from delay 14 thereafter sets the flip-flop 20 providing an output on 26 to the memory 28 which is registered in accordance with the addressing means 30. The next AND gate which is enabled is the gate $A_{33}$ since the source 12 provides the next pulse 67 microseconds later, the timing required for this delay in the line 10 is 67 microseconds after the output from line $D_2$, which is an output on line $D_{33}$. Thus, the next terminal to be sampled is $T_{33}$, while the next gate enabled is $A_{28}$. Thus the sequence by which the different gates are enabled, starting with gate $A_2$ is; A2–A33–A28–A23–A18–A13–A8–A3–A34–A29–A24–A19–A14–A9–A4–A35–A30–A25–A20–A–15–A10–A5–A36–A31–A26–A21–A16–A11–A6–A1–A32–A27–A22–A17–A12–A7–A2, etc. Each terminal is sampled once before any other terminal, $T_2$ is sampled again.

In both the embodiments described above, where the number of input terminals $T_N$ is given and N is an odd number, the timing interval of pulses from the source 12 is always an even integer, while conversely, where the number of lines N is an even number, the timing interval of pulses from source 12 is such as to require an odd timing integer. The timing is then seen to be such as to provide a lumped delay line having N output terminals of a length of NR $10^{-3}$, or N microseconds and a clock source 12 timed to emit a pulse every $SR/N$, or M microseconds with $N \times M$ equal to the desired sample rate (SR) and the timing is such that N and M have no common denominator. To insure that each of these limitations are fulfilled, the number of input terminals N, or the timing of source 12, M, is a prime number.

While the invention has been particularly shown and described with reference to preferred embodiments thereof, it will be understood by those skilled in the art that various changes in form and details may be made therein without departing from the spirit and scope of the invention.

What is claimed is:

1. A scanning circuit for slowly scanning a number of N information input terminals bearing information impulses of given duration during a predetermined sampling interval SR determined by a number of desired samplings of each impulse of each terminal where S is a number and R is a unit time increment, a high speed lumped constant delay line of NR $10^{-3}$ length having N sequential output taps for providing a pulse on each tap displaced from an adjacent tap by a R$10^{-3}$ unit time increment, a pulse generator for providing a sequence of pulses each displaced from one another by M time increments, where M is an integer approximately equal to $SR/N$ and M and N have no common denominator, and gating means comprising a plurality of N logical AND circuits coupled to a memory through a plurality of logical OR circuits for gating the impulses on each N information input terminal with a respective one of the pulses of said N output taps of said delay line and the pulses from said pulse generator whereby each said N terminal is sequentially scanned and the information registered in said memory.

2. A scanning circuit for slowly scanning a number of N information input terminals during a predetermined sampling interval SR, where S is a number and R is a unit time increment, a high speed delay line of NR $10^{-3}$ length having N sequential output taps for providing a pulse on each tap displaced from an adjacent tap by an R $10^{-3}$ unit time increment, a pulse generator for providing a sequence of pulses each displaced by M time increments where M is approximately equal to $SR/N$ and M and N are integers one of which being a prime number, and gating means comprising a plurality of N logical AND circuits for gating each of said N information input terminals with a respective one of the N output taps of said delay line and the pulses from said pulse generator.

3. In a circuit for slowly scanning a number of N input terminals during a predetermined sampling interval SR, where S is a number and R defines a unit time interval comprising a $NR \times 10^{-3}$ lumped constant delay line having N output taps, a clock pulse source for providing a sequence of pulses displaced by M increments of time where M is approximately equal to $SR/N$ and means interconnecting said N input terminals, the N output taps of said delay line, and the output of said clock pulse source to N gate circuits for gating the information from each input terminal at a rate equal to the pulse rate of said clock pulse source and initiating means for providing an initiating pulse to said delay line and clock pulse source to initiate a sampling cycle.

4. A scanning circuit as set forth in claim 3 where M and N are integers and are prime numbers with respect to each other.

References Cited by the Examiner

UNITED STATES PATENTS 2,845,609 7/1958 Newman ___________ 340—167

NEIL C. READ, *Primary Examiner.*

ROBERT H. ROSE, *Examiner.*